US011667862B2

(12) United States Patent
Roberts et al.

(10) Patent No.: US 11,667,862 B2
(45) Date of Patent: Jun. 6, 2023

(54) REACTOR FOR BIOMASS PROCESSING

(71) Applicant: PrairieChar, Inc., Topeka, KS (US)

(72) Inventors: Griffin William Roberts, Springboro, OH (US); Robert K. Herrington, Topeka, KS (US); Curtis S. Crawford, Overland Park, KS (US)

(*) Notice: Subject to any disclaimer, the term of this patent is extended or adjusted under 35 U.S.C. 154(b) by 91 days.

(21) Appl. No.: 17/023,166

(22) Filed: Sep. 16, 2020

(65) Prior Publication Data

US 2021/0139802 A1 May 13, 2021

Related U.S. Application Data

(60) Provisional application No. 62/934,769, filed on Nov. 13, 2019.

(51) Int. Cl.
*C10L 5/42* (2006.01)
*C10L 5/46* (2006.01)
(Continued)

(52) U.S. Cl.
CPC ............... *C10L 5/42* (2013.01); *C05F 3/04* (2013.01); *C05F 3/06* (2013.01); *C05F 5/002* (2013.01);
(Continued)

(58) Field of Classification Search
CPC .. C10L 5/42; C10L 5/406; C10L 5/445; C10L 5/46; C10L 2200/0469; C10L 2290/06; C10L 3/08; C10L 5/447; C10L 2290/10; C10L 2290/26; C10L 2290/28; C10L 2290/46; C10L 9/08; C05F 3/04; C05F 3/06; C05F 5/002; C05F 17/40;
(Continued)

(56) References Cited

U.S. PATENT DOCUMENTS

2009/0013603 A1* 1/2009 Rolland ................ C10L 5/44
48/209
2010/0184176 A1* 7/2010 Ishida ................... C12M 45/20
435/165
(Continued)

FOREIGN PATENT DOCUMENTS

CN 104611963 B * 3/2017 ............ D12B 1/36
CN 106631196 A * 5/2017 ............ C05F 17/00
(Continued)

OTHER PUBLICATIONS

Machine translation of CN-104611963-B (Year: 2017).*

*Primary Examiner* — Wayne A Langel
(74) *Attorney, Agent, or Firm* — Blake E. Vande Garde; Avek IP, LLC (57) ABSTRACT

An system for processing biomass comprising a stator, a rotor having an axis of rotation, the rotor being disposed inside the stator and configured to rotate about the axis of rotation therein, a processing chamber defined between the rotor and the stator, an inlet in fluid communication with the processing chamber which is designed to introduce unprocessed biomass into the processing chamber, an outlet in fluid communication with the processing chamber which is designed to carry out processed biomass from the processing chamber and a pump operationally associated with the inlet and the outlet, wherein the pump is configured to pump the unprocessed biomass through the processing chamber.

24 Claims, 5 Drawing Sheets

(51) Int. Cl.
| | |
|---|---|
| *C10L 5/44* | (2006.01) |
| *C10L 5/40* | (2006.01) |
| *C05F 17/60* | (2020.01) |
| *C05F 17/929* | (2020.01) |
| *C05F 5/00* | (2006.01) |
| *C05F 3/06* | (2006.01) |
| *C05F 3/04* | (2006.01) |
| *C05F 17/986* | (2020.01) |
| *C05F 17/40* | (2020.01) |

(52) U.S. Cl.
CPC .............. *C05F 17/40* (2020.01); *C05F 17/60* (2020.01); *C05F 17/929* (2020.01); *C05F 17/986* (2020.01); *C10L 5/406* (2013.01); *C10L 5/445* (2013.01); *C10L 5/46* (2013.01); *C10L 2200/0469* (2013.01); *C10L 2290/06* (2013.01)

(58) Field of Classification Search
CPC ...... C05F 17/60; C05F 17/929; C05F 17/986; C05F 17/90; Y02A 40/20; Y02E 50/10; Y02E 50/30; Y02P 20/145; Y02W 30/40
See application file for complete search history.

(56) References Cited

U.S. PATENT DOCUMENTS

2014/0131189 A1* 5/2014 Gallagher ................. C10L 5/44
 202/175
2014/0262727 A1 9/2014 Felix et al.

FOREIGN PATENT DOCUMENTS

| DE | 102009007302 | 8/2010 | | |
|---|---|---|---|---|
| EP | 1970431 A1 | 9/2008 | | |
| EP | 2484434 A1 | 8/2012 | | |
| WO | WO 2017/156610 A1 * | 9/2017 | ............. | C05F 17/00 |

\* cited by examiner

REACTOR FOR BIOMASS PROCESSING

CROSS REFERENCE TO RELATED APPLICATION

This application claims the priority of the provisional application Ser. No. 62/934,769 filed Nov. 13, 2019. Applicant hereby incorporates by reference the entire content of provisional application Ser. No. 62/934,769.

FIELD OF INVENTION

The present invention pertains generally to biomass and, more specifically to biomass processing.

BACKGROUND OF THE INVENTION

The world produces a nearly limitless supply of biomass annually. Sources include animal waste, sewage sludge, bacteria, algae, agricultural waste among others. Agricultural waste is unwanted waste produced as a result of agricultural activities. Agricultural wastes include manure, oil, silage plastics, fertilizer, pesticides and herbicides, wastes from farms, poultry houses and slaughterhouses. Pesticides and herbicides are used to control pests, but when persistently applied resulted in being accumulate in soil where it may be harmful for beneficial microbes and pollinators. Most pesticides and fertilizers are water-soluble and can leach and enter into the water table as well as enter into potential food products.

Fertilizers are a major source of agricultural waste because they contain nutritive minerals such as nitrogen, phosphorus, and potassium which aid and allow plants to grow faster and increase yields. However, when fertilizers are released into the open environment, this leads to eutrophication of the aquatic environment. Fertilizers also greatly effect soil health which is defined as the continued capacity of soil to function as a vital living ecosystem that sustains plants, animals, and humans.

Additionally, there is always a need to create and refine new energy sources to satisfy the world's ever-increasing need for energy. Thus, there is clearly a need for a device and process which addresses these issues. More specifically, there is a need for technology which breaks down biomass into a form which is beneficial to the soil and crop growth while simultaneously creating an energy source resulting in a carbon-neutral process.

SUMMARY OF THE INVENTION

An system for processing biomass comprising a stator, a rotor having an axis of rotation, the rotor being disposed inside the stator and configured to rotate about the axis of rotation therein, a processing chamber defined between the rotor and the stator, an inlet in fluid communication with the processing chamber which is designed to introduce unprocessed biomass into the processing chamber, an outlet in fluid communication with the processing chamber which is designed to carry out processed biomass from the processing chamber and a pump operationally associated with the inlet and the outlet, wherein the pump is configured to pump the unprocessed biomass through the processing chamber.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The instant invention discloses a system for processing biomass comprising a stator, a rotor having an axis of rotation, the rotor being disposed inside the stator and configured to rotate about the axis of rotation therein. The system includes a processing chamber defined between the rotor and the stator with an inlet in fluid communication with the processing chamber which is designed to introduce unprocessed biomass into the processing chamber and an outlet in fluid communication with the processing chamber which is designed to carry out processed biomass from the processing chamber. The system further includes a pump operationally associated with the inlet and the outlet wherein the pump is configured to pump the unprocessed biomass through the processing chamber.

Figure 1:
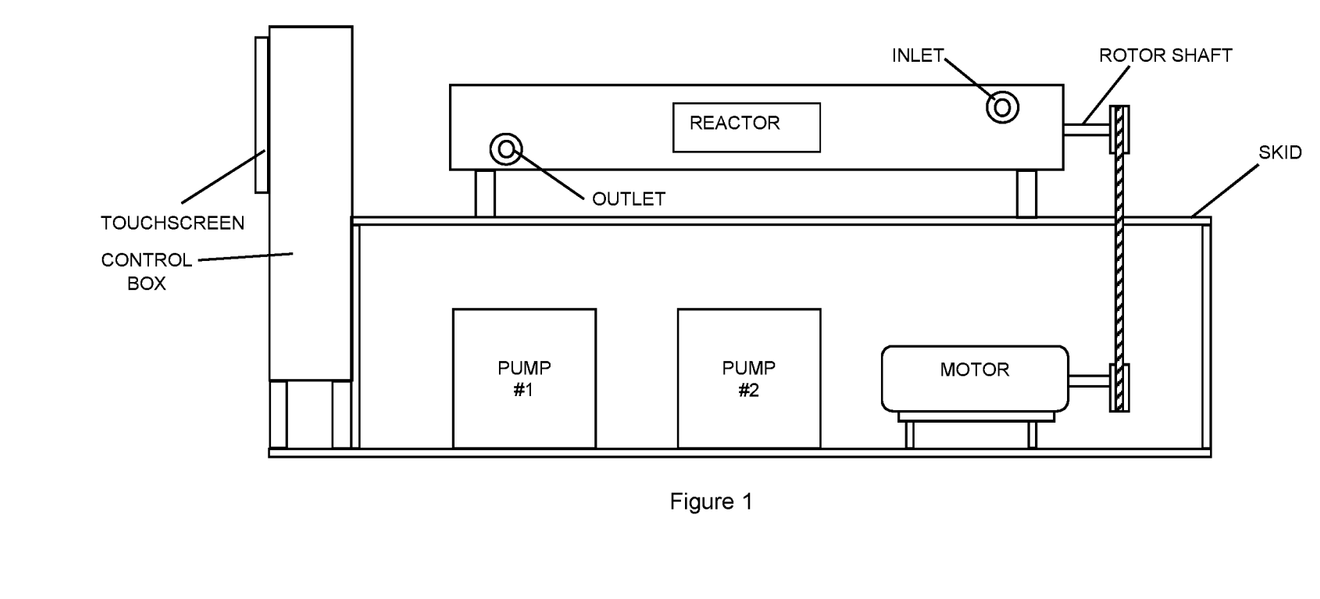
FIG. 1 is an overhead view of one embodiment of the instant invention.

Looking to FIG. 1, the system is shown to include a reactor with an inlet and an outlet. A rotor shaft extends from the reactor and the rotor shaft is engaged with a motor which is configured to rotate the rotor at a desired speed. The motor can be any motor known in the art, including a variable speed electric drive motor. A pair of pumps are also illustrated. The pumps are operationally associated with the inlet and the outlet and are configured to pump the unprocessed biomass through the processing chamber. The pumps also aid in bringing water into the processing chamber and with pressurizing the processing chamber. The pumps are also operationally associated with one or more manifolds which aid in the flow of water, oil, or any other liquids associated with the system and its functions.

Figure 2A:
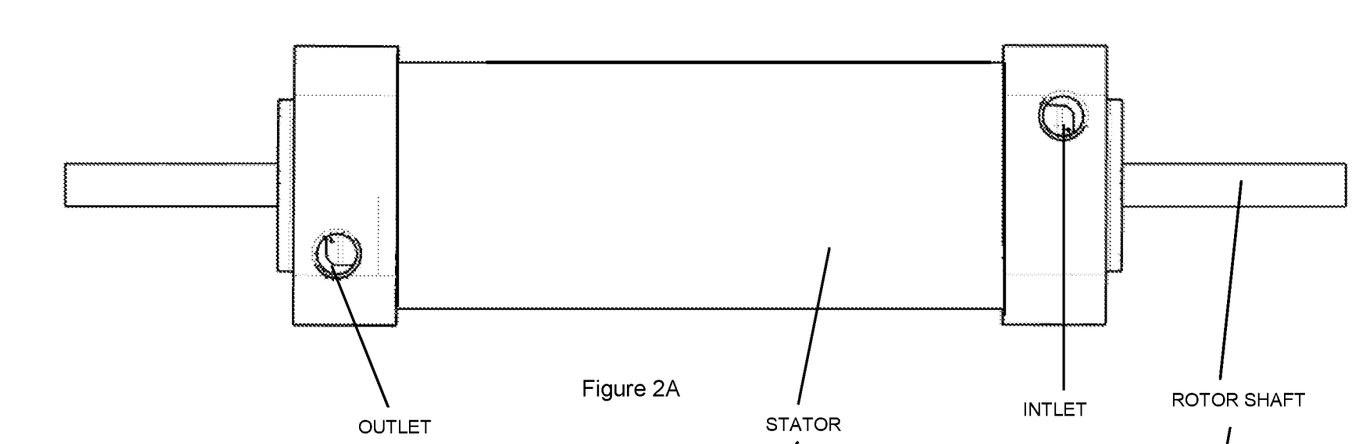
FIG. 2A is a side view of the Reactor.
Figure 2B:
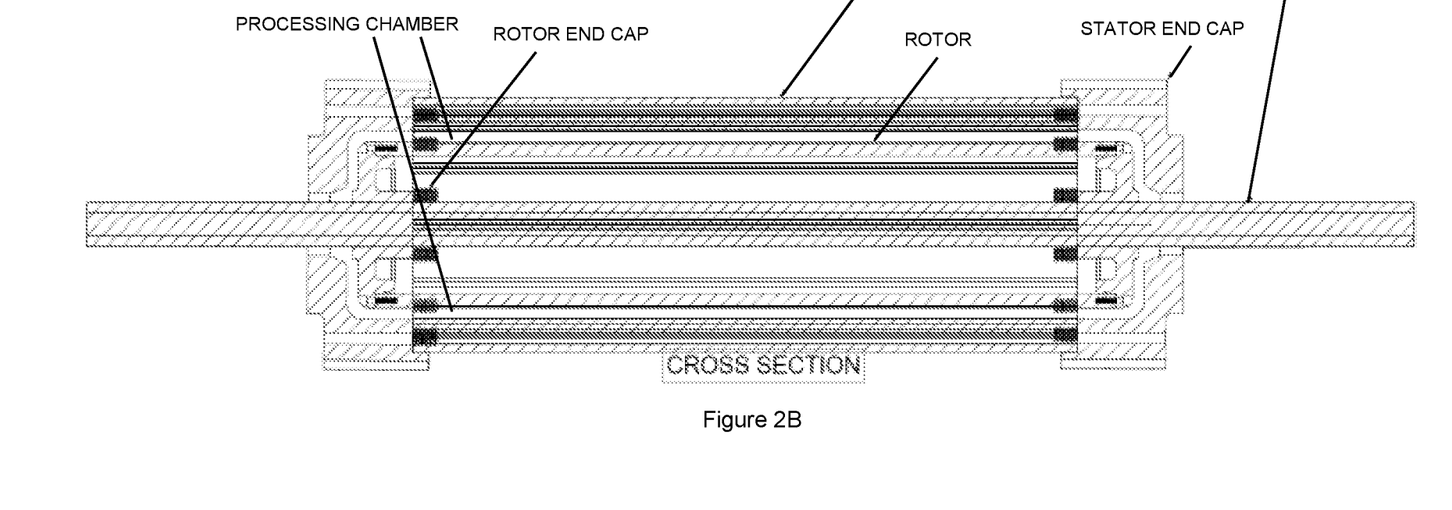
FIG. 2B is a Cross Section of FIG. 2A

Looking to FIGS. 2A and 2B, there is illustrated one embodiment of a reactor, which include a stator, a rotor disposed inside the stator, a rotor shaft connected to the rotor and extending out of the stator, an inlet to allow materials (i.e., biomass, water, etc.) into the reactor, and out outlet to allow materials (i.e., biomass, water, liqueur, hydrochar, etc.) out of the reactor. FIG. 2B also illustrates on embodiment of a processing chamber which is the space defined between the rotor and the stator and is the location where the biomass is processed. The rotor can be tapered from a first end to a second end, providing a variance in the width of the processing chamber. The processing chamber can have a varying width in the range of 300 to 15000 microns, 500 to 13000 microns, 500 to 12000 microns, 500 to 11000 microns, 500 to 10000 microns, 500 to 9000 microns, 500 to 8000 microns, 500 to 7000 microns, 500 to 6000 microns, 1000 to 13000 microns, 2000 to 13000 microns, 3000 to 13000 microns, 4000 to 13000 microns, 5000 to 13000 microns, 1000 to 10000 microns, 2000 to 12000 microns, 1000 to 12000 microns, 2000 to 14000 microns, 1000 to 15000 microns, 2000 to 15000 microns, 1500 to 10000 microns, or any combination thereof. The processing chamber can also have a width which is a multiple of any particle size of the unprocessed biomass selected from 0.1, 0.2, 0.3, 0.4, 0.5, 0.6, 0.7, 0.8, 0.9, 1.0, 2.0, 3.0, 4.0, 5.0, 6.0, 7.0, 8.0, 9.0 or 10.0.

Surface roughness, particularly at macro, micro- and nano-scale in fluid flow, can cause a multitude of problems in many applications. Providing materials with ultra-smooth surfaces via micro-polishing can improve performance. The rotor and the stator can each have smooth surfaces. The rotor and the stator can have mirror, smooth surfaces. The rotor and the stator can have polished smooth surfaces. The rotor and the stator can be coated with one or more materials to provide or enhance the smoothness and/or durability of their surfaces. The coatings can be deposited in a multitude of ways including, but not limited to, electroplating, polymer coating, or a combination thereof. The coatings may be hydrophobic, oleophobic, or a combination thereof.

The system processes the unprocessed biomass in a continuous process. The system can process biomass in the range of 98/2% solids to water or 2/98% solids to water. The system can also process biomass in the range of 95/5%, 90/10%, 85/15%, 80/20%, 75/25%, 70/30%, 65/35%, 60/40%, 55/45%, 50/50%, 45/65%, 40/60%, 35/65%, 30/70%, 25/75%, 20/80%, 15/85%, 10/90%, or 5/95% solids to water. The system processes biomass where it undergoes Hydrothermal Carbonization, producing both hydrochar and a liqueur. The liqueur can be subjected to further processing.

The system will operate within the hydrothermal process temperature range between 180° C. and 250° C. and at a pressure of 20-40 bar.

The rotational force and kinetic energy created by the combination of the spinning rotor, the heated water, and the pressure generated within the processing chamber of the reactor help to break down the biomass through shear force, friction, and radial force. These factors combine to break the biomass down both physically and molecularly, breaking chemical bonds and freeing up the carbon, nitrogen, phosphorus, and potassium which are vital to plant growth.

Hydrothermal Carbonization (HTC) is a treatment process which converts wet biomass into homogenized, carbon rich, and energy dense solid fuel, and/or soil amendment called hydrochar. Put differently, HTC is a chemical process for the conversion of organic compounds into structured carbons. The use of moisture as a reaction medium and reactant is a significant advantage of HTC as it eliminates the expenditure of time and/or energy in drying the biomass prior to treatment. As water is heated and pressurized, it becomes a solvent, a catalyst, and a mild acid to the wet biomass. The biomass undergoes rapid hydrolysis and other reactions when subjected to HTC, releasing oxygen-containing volatiles and producing a highly hydrophobic hydrochar. Using previous equipment and techniques, the exothermic process would take hours to complete. Using the equipment and methods in the instant application, the process is completed in minutes or even seconds.

HTC appears to offer a simple and straightforward solution to process biomass. Unfortunately, the requirements of high temperature and high pressure have previously made the process complex to design and costly to operate. Looking at HTC batch processes in comparison with HTC continuous processes, the HTC batch process is simply not cost-effective for industrial-scale deployment. An HTC continuous process offers portability, a relatively small footprint, substantial energy recovery and most importantly, efficiency.

The system described herein can subject unprocessed biomass to HTC in a matter of minutes or seconds, which is a monumental leap forward from the hours or days of previous systems. The instant system also retains more nutrients than previous HTC systems. In one embodiment of the instant invention, the HTC is completed in less than 4 hours, less than 3.5 hours, less than 3 hours, less than 2.5 hours, less than 2 hours, less than 1.5 hours, less than 1 hour, less than 45 minutes, less than 30 minutes, less than 25 minutes, less than 20 minutes, less than 15 minutes, less than 10 minutes, less than 5 minutes or less than 1 minute. As stated previously, biomass sources include animal waste, sewage sludge, bacteria, algae, agricultural waste among others. Agricultural waste is unwanted waste produced as a result of agricultural activities. Agricultural wastes include manure, oil, silage plastics, fertilizer, pesticides and herbicides, wastes from farms, poultry houses and slaughterhouses.

The system also includes a control box operationally associated with the reactor (stator, rotor, inlet and outlet), motor, pump #1 and pump #2 as well as any other component which is not illustrated, but necessary to operate the system. The control panel also includes data storage of any type known in the art for recording and/or transmission of all desired data. A computer/processing computer (i.e. touchscreen) is operationally associated with the control panel for processing the recorded data. The computer also includes data storage of any type known in the art for recording and/or transmission of all desired data. The computer controls and executes one or more programs which carry out the processing of the biomass and the operation of the system's various components.

Figure 3:
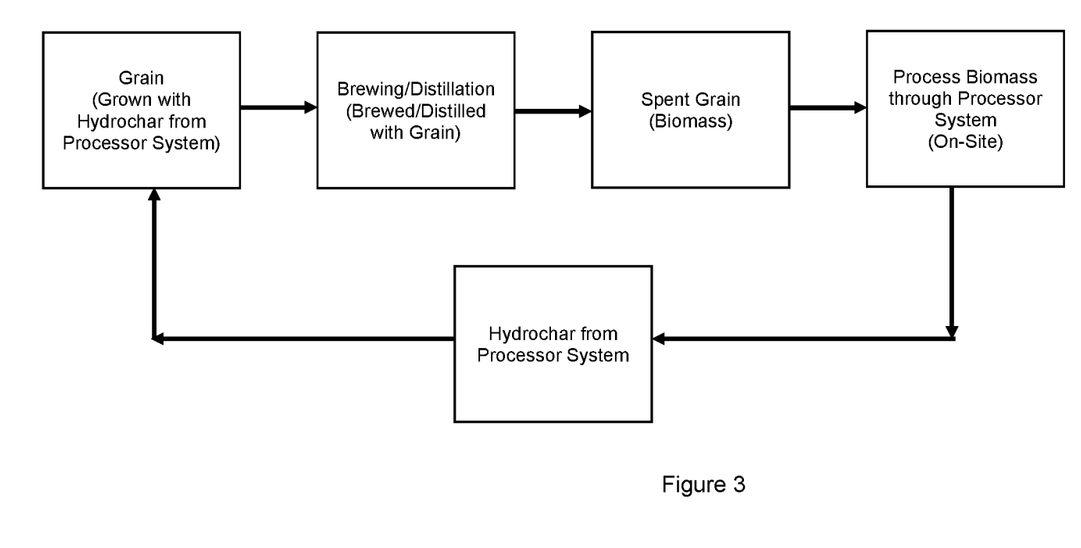
FIG. 3 is one embodiment illustrating the steps of biomass being processed.

FIG. 3 illustrates one embodiment of a cycle which grain will undergo using the system described herein. Grain is grown and harvested and that grain is sent to a brewer/distiller for conversion into some form of alcohol leaving spent grain. The spent grain (biomass) is then sent through the processor system described herein in an on-site system due to the portability of the system size. The system produces hydrochar which is sent back to the farmer to use as a Farm input.

Figure 4:
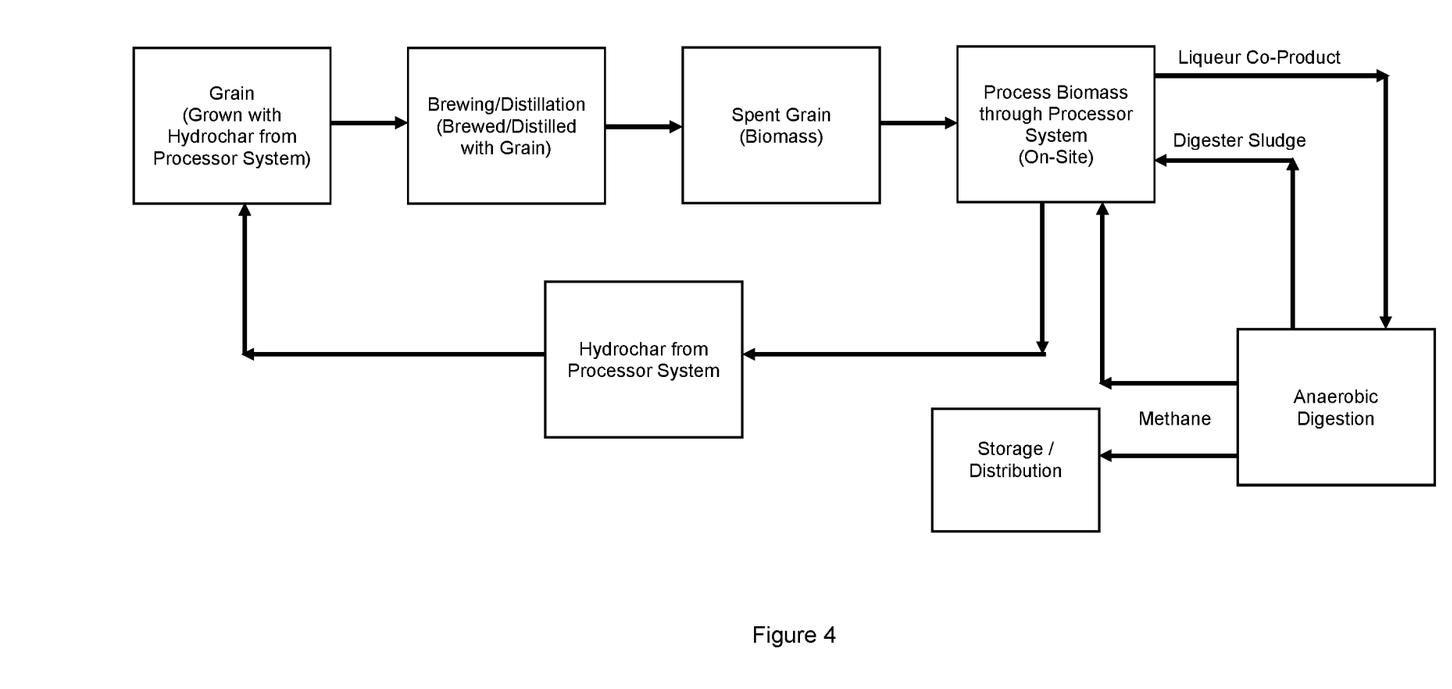
FIG. 4 is one embodiment illustrating the steps of biomass being processed.
Figure 5:
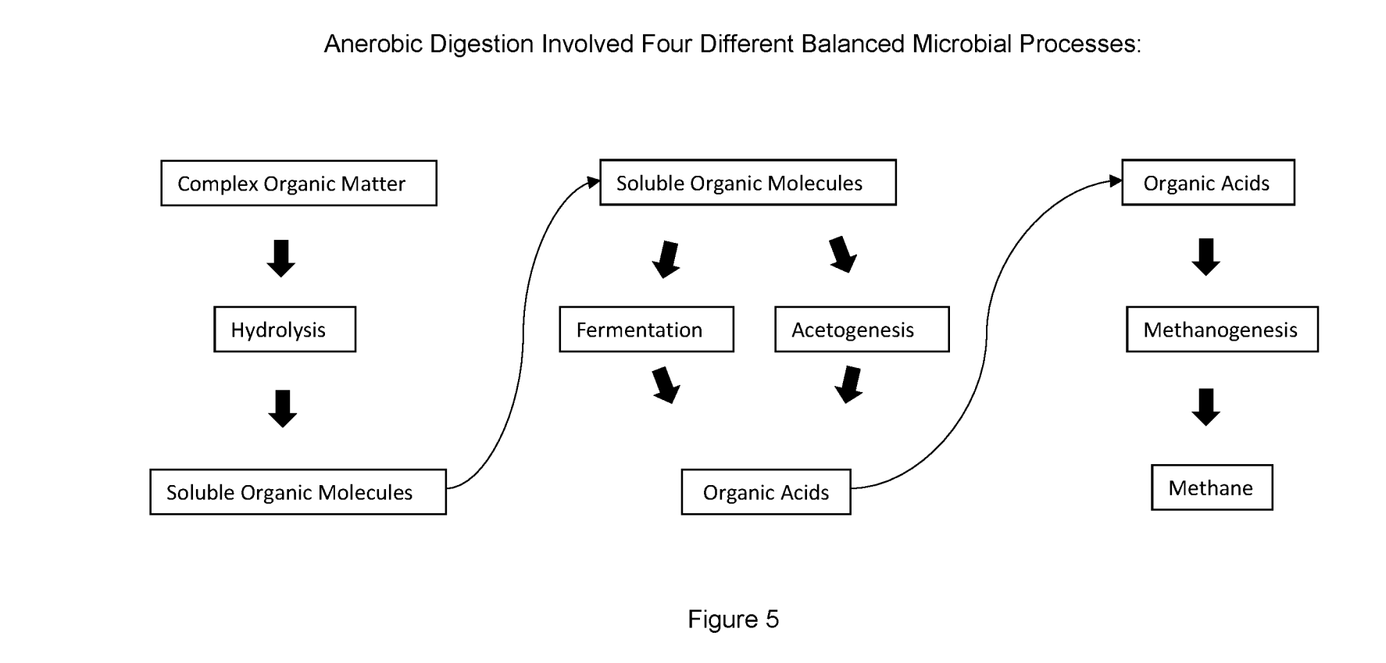
FIG. 5 is an illustration of the anaerobic digestion process.

FIG. 4 illustrates one embodiment of a cycle which grain will undergo using the system described herein. Grain is grown and harvested and that grain is sent to a brewer/distiller for conversion into some form of alcohol leaving spent grain. The spent grain (biomass) is then sent through the processor system described herein in an on-site system due to the portability of the system size. The system produces hydrochar and a liqueur co-product. The hydrochar is sent back to the farmer to use as a Farm input. The liqueur is sent for further processing through an anaerobic digestion process (see FIG. 5) producing both digester sludge (which is returned to the system processor for re-processing) and methane. The methane can be used to heat and power the processor system as well as be used for any other desired process.

The instant invention further includes a method for processing biomass comprising the steps of:
a) providing an apparatus for processing biomass comprising:
   a stator;
   a rotor having an axis of rotation, the rotor being disposed inside the stator and configured to rotate about the axis of rotation therein;
   a processing chamber defined between the rotor and the stator;
   an inlet in fluid communication with the processing chamber which is designed to introduce unprocessed biomass into the processing chamber;
   an outlet in fluid communication with the processing chamber which is designed to carry out processed biomass from the processing chamber; and
   a pump operationally associated with the inlet and the outlet;
   wherein the pump is configured to pump the unprocessed biomass through the processing chamber;
b) adding unprocessed biomass through the inlet into the processing chamber;
c) adding water through the inlet into the processing chamber;
d) processing the water and the unprocessed biomass within the processing chamber by heating and pressurizing the water and the unprocessed biomass within the processing chamber while rotating the rotor about the axis of rotation creating a radial force;
e) producing hydrochar and liqueur;
f) collecting the hydrochar; and
g) collecting the liqueur.

Any method described herein may incorporate any design element contained within this application and any other document/application incorporated by reference herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The present invention may be embodied in other forms without departing from the spirit and the essential attributes thereof, and, accordingly, reference should be made to the appended claims, rather than to the foregoing specification, as indicating the scope of the invention. The invention illustratively disclosed herein suitably may be practiced in the absence of any element which is not specifically disclosed herein.

The invention claimed is:

1. A system for processing biomass comprising:
a stator;
a rotor having an axis of rotation, the rotor being disposed inside the stator and configured to rotate about the axis of rotation therein, and the rotor having a smooth, tapered, outer surface;
a processing chamber defined between the rotor and the stator;
an inlet in fluid communication with the processing chamber which is designed to introduce unprocessed biomass into the processing chamber;
an outlet in fluid communication with the processing chamber which is designed to carry out processed biomass from the processing chamber; and
a pump operationally associated with the inlet and the outlet;
wherein the pump is configured to pump the unprocessed biomass through the processing chamber.

2. The system for processing biomass of claim 1 wherein the biomass can undergo Hydrothermal Carbonization within the system.

3. The system for processing biomass of claim 2 wherein the system is capable of completing the Hydrothermal Carbonization process in less than 4 hours.

4. The system for processing biomass of claim 2 wherein the system is configured to use a continuous flow process.

5. The system for processing biomass of claim 1 wherein the biomass is comprised of wet biomass.

6. The system for processing biomass of claim 5 wherein the wet biomass includes agricultural waste, animal waste, human waste, or industrial vegetation-based waste.

7. The system for processing biomass of claim 1 wherein the rotor is tapered from a first end to a second end.

8. The system for processing biomass of claim 1 wherein the processing chamber has a varying width in the range of 500 to 13000 microns.

9. The system for processing biomass of claim 1 wherein the rotor and the stator have a smooth surface.

10. The system for processing biomass of claim 1 further comprising: one or more inlets which enable the introduction of a combination of water and biomass which has been heated under pressure into the processing chamber.

11. The system for processing biomass of claim 1 wherein hydrochar and liqueur are end products of the system.

12. The system for processing biomass of claim 1 wherein the system is capable of operating within the hydrothermal process temperature range and pressure range.

13. A method for processing biomass comprising the steps of:
providing an system for processing biomass comprising:
a stator;
a rotor having an axis of rotation, the rotor being disposed inside the stator and configured to rotate about the axis of rotation therein, and the rotor having a smooth, tapered surface;

a processing chamber defined between the rotor and the stator;

an inlet in fluid communication with the processing chamber which is designed to introduce unprocessed biomass into the processing chamber;

an outlet in fluid communication with the processing chamber which is designed to carry out processed biomass from the processing chamber; and a pump operationally associated with the inlet and the outlet;

wherein the pump is configured to pump the unprocessed biomass through the processing chamber;

adding unprocessed biomass through the inlet into the processing chamber;

adding water through the inlet into the processing chamber; and processing the water and the unprocessed biomass within the processing chamber by heating and pressurizing the water and the unprocessed biomass within the processing chamber while rotating the rotor about the axis of rotation creating a radial force.

14. The method of claim 13 wherein the biomass undergoes Hydrothermal Carbonization within the system.

15. The method of claim 14 wherein the Hydrothermal Carbonization process in less than 4 hours.

16. The method of claim 14 wherein the process is a continuous flow process.

17. The method of claim 13 wherein the biomass is comprised of wet biomass.

18. The method of claim 17 wherein the wet biomass includes agricultural waste, animal waste, human waste, or industrial vegetation-based waste.

19. The method of claim 13 wherein the system produces hydrochar and liqueur.

20. The method of claim 19 wherein the liqueur is further processed using an anaerobic digestion method.

21. The method of claim 13 wherein the rotor is tapered from a first end to a second end.

22. The method of claim 13 wherein the processing chamber has a varying width in the range of 500 to 13000 microns.

23. The method of claim 13 wherein the rotor and the stator have a smooth surface.

24. The method of claim 13 wherein the system operates within the hydrothermal process temperature range and pressure range.

* * * * *